Oct. 9, 1962     A. ALLEN     3,057,594
FLUID FLOW PRESSURE SWITCH DEVICE
Filed July 11, 1957     2 Sheets-Sheet 1
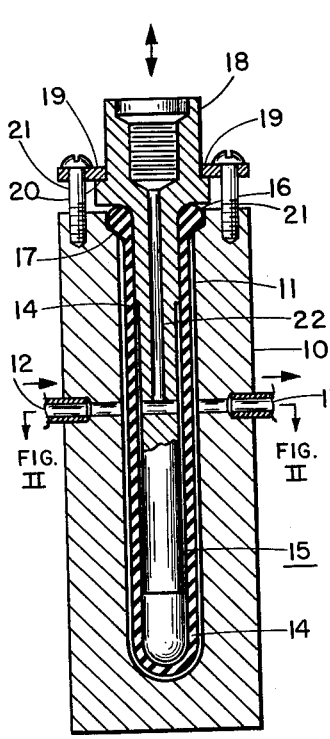
FIG. I
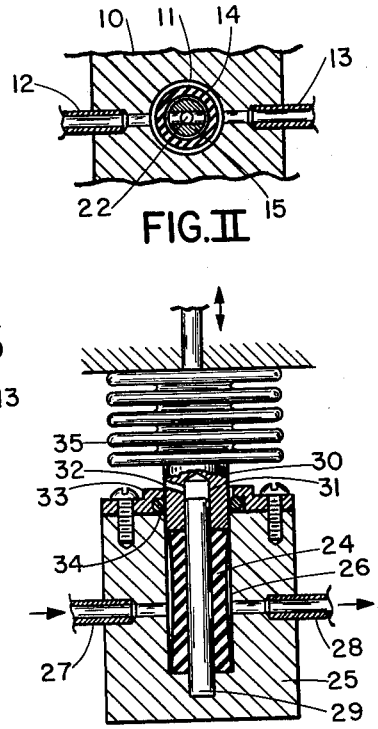
FIG. IV
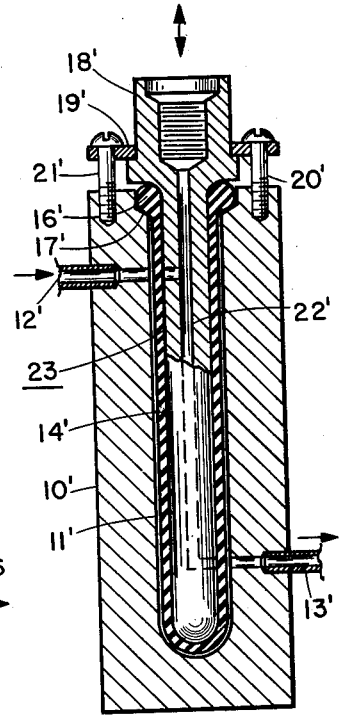
FIG. III
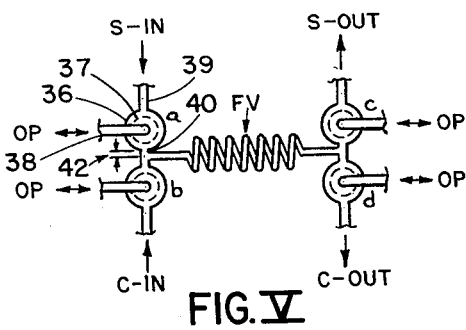
FIG. V
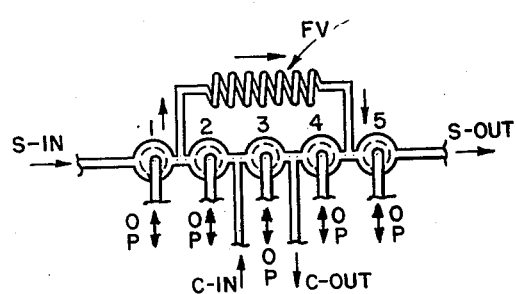
FIG. VI
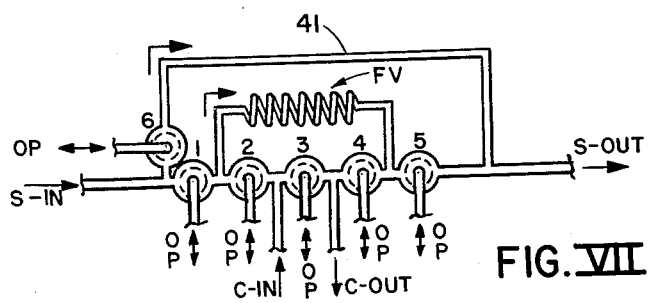
FIG. VII
INVENTOR
ALBERT ALLEN
BY
Lawrence H. Patton
AGENT Oct. 9, 1962 A. ALLEN 3,057,594
FLUID FLOW PRESSURE SWITCH DEVICE
Filed July 11, 1957 2 Sheets-Sheet 2
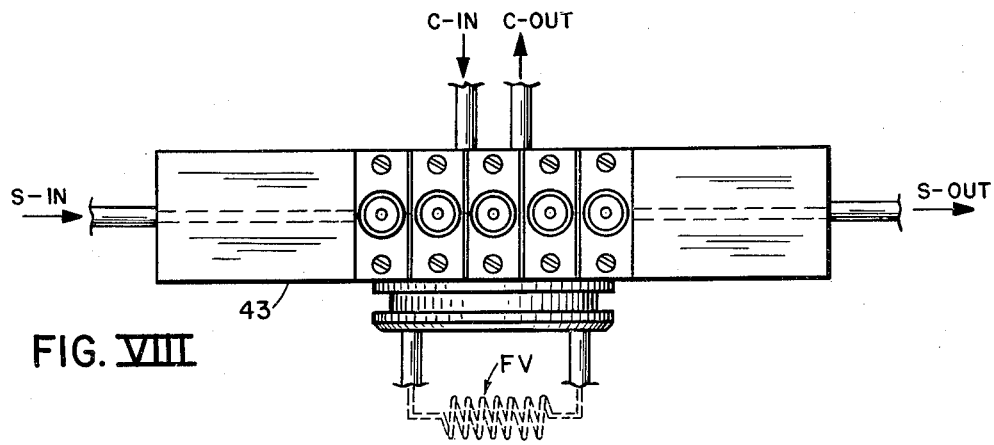
FIG. VIII
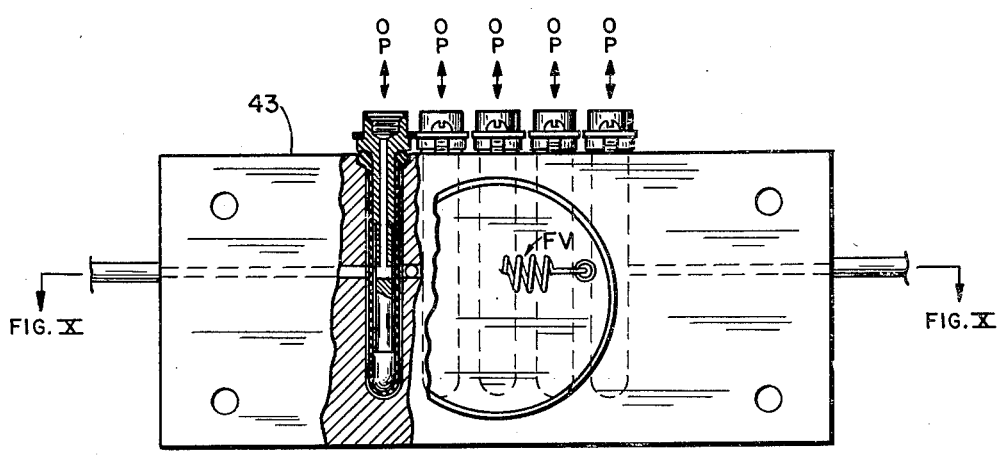
FIG. IX
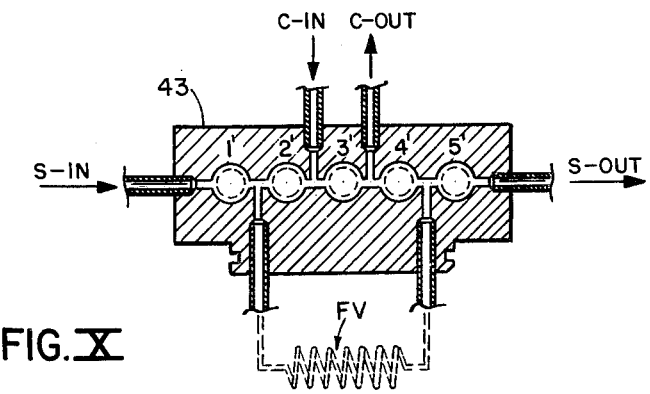
FIG. X
INVENTOR
ALBERT ALLEN
BY
Lawrence H. Potton
AGENT 3,057,594
FLUID FLOW PRESSURE SWITCH DEVICE
Albert Allen, Sharon, Mass., assignor to The Foxboro Company, Foxboro, Mass., a corporation of Massachusetts
Filed July 11, 1957, Ser. No. 671,288
3 Claims. (Cl. 251—61)

This invention relates to the control of the flow of fluids and has particular reference to pressure operated switch devices therefor.

In many forms of modern industrial instrumentation particularly in the field of flow control of relatively small volumes of gaseous fluid it is desirable to use switching devices for controlling such flows, with such switching devices simple, inexpensive, positive, and sure in their action. It is desirable in this connection that such switching devices avoid the use of rotating or sliding parts as is customary in many structures. With such rotating or sliding part devices it is often necessary to manufacture them to expensive close tolerances in order to avoid losses and inaccuracies in the control of fluid flow, particularly in the case of small volume gaseous flow where even small losses assume substantial relative proportions.

This invention avoids such undesirable structures and is directed to a new and useful fluid flow pressure switch device which is operated on the basis of pressure actuation of a flexible member. Its operation is based on the application of pressure to flexible means with the pressure usually being pneumatic, and with the flexible means accomplishing area contact to close off the flow passage ports of the device. Because of the conformation of the flexible means to any seating arrangement around such ports, manufacturing tolerances can be generous.

A simple form of this device may thus be used as an on-off switch in a gaseous flow pipe. A more involved form of the switch device of this invention may be used to advantage as a gas sampling device, for example in the field of chromatography. In one manner of general operation of this field a carrier gas is passed through a conduit and, at selected intervals, a slug of sample gas is inserted as a body into the stream of carrier gas which is interrupted for this purpose. In the course of such an operation it is important to sharply and efficiently block off the carrier gas at particular points, to similarly block off a slug of sample gas, and to operate a switching device in such a fashion as to insert the sample gas slug as a body into the carrier gas stream with a minimum of dead space error. The pressure switch device of this invention is well adapted for such a chromatographic analysis application.

It is an object of this invention to provide a new and improved gaseous flow pressure switch device.

Other objects and advantages of this invention will be in part apparent and in part pointed out hereinafter and in the accompanying drawings, wherein:

FIGURE I is an illustrative embodiment of this invention shown substantially completely in vertical central section as a simple form of a pneumatically operated gaseous flow control pressure switch device unit;

FIGURE II is a transverse section of the FIGURE I embodiment of this invention, taken in the direction and at the location indicated by II—II in FIGURE I as if the FIGURE I structure were a whole, unsectioned structure;

FIGURES III and IV are illustration of alternate structures each embodying this invention, with each of these structures illustrated substantially completely in vertical central section;

FIGURE V is a schematic illustration of a gas sampling switch device according to this invention;

FIGURES VI and VII are schematic illustrations of alternate forms of gas sampling switch devices, each according to this invention;

FIGURE VIII is a plan view of a structure according to this invention, embodying the device of FIGURE VI;

FIGURE IX is a front elevation of the structure of FIGURE VIII, in partial vertical central section; and FIGURE X is a reduced size section of the structure of FIGURE IX, taken as on line X—X in FIGURE IX, and taken as if FIGURE IX were complete and unsectioned, but showing each switch unit schematically only.

The illustrative embodiment of this invention as shown in the structure of FIGURE I is in the form of a pneumatically operated switch unit for controlling gaseous flow. It comprises a switch block 10 having a generally cylindrical dead-end recess 11 extending thereinto.

In a transverse arrangement with respect to the switch recess 11, a gas inlet passage 12 is provided about midway of the length of the recess 11 for the introduction of gas to the recess 11 through the side wall thereof. Similarly, in lengthwise alignment and diametrically opposite to the gas input passage 12 a gas outlet passage 13 is provided. Thus with the mouth of the recess 11 suitably sealed, gas may be made to flow into the recess 11 through the inlet passage 12, transversely, although circuitously as will be seen hereinafter, across the recess 11 and out through the outlet passage 13. Such gas, in connection with the use of this switch unit in the operation of a chromatographic system, may be either the carrier gas, or the sample gas, according to the particular desired use and arrangement of the switch unit.

Within the FIGURE I switch recess 11 and extending substantially the full length thereof, a flexible, sock-like sleeve 14 is provided, and may be formed of a suitable grade of rubber, plastic or the like. For example, butyl rubber or combinations thereof which are usable in relatively high temperature conditions. The inlet and outlet passages 12 and 13 may thus be closed off upon the application of a fluid pressure to the interior of the tube 14.

When the switch unit is in its off, unenergized condition, the flexible sleeve 14 in the recess 11 is at least partially collapsed and the gas passes between inlet 12 and outlet 13 by travelling transversely around the tube 14. As a means of preventing the full collapse of the sleeve 14 and the possible consequent blocking of one or both of the passages 12 and 13 when the switch is in its off condition, a rigid finger-like support member 15 is mounted within the flexible sleeve 14. This rigid member 15 is generally cylindrical with end diameters about that of the normal relaxed diameter of the sleeve 14, and a somewhat lesser lengthwise central diameter. The finger 15 extends throughout the length of the flexible sleeve 14.

The flexible sleeve 14 is preferably slightly stretched lengthwise on the finger 15. As in FIGURE I, the mouth of the sleeve 14 is in the form of an annulus 16 which is seated in an annular counterbore 17 formed in the switch block 10 at the mouth of the recess 11. The bottom of the counterbore 17 is inwardly and downwardly tapered in inverted frustro-conical fashion, so that downward pressure on the sleeve annulus 16 forces this annulus into increasingly tighter sealed relationship both with the switch block 10 and the finger 15. As a means of providing such pressure, the finger 15 is provided with an increased diameter end portion 18 outside of the switch block 10. This arrangement provides the finger 15 with a head portion which bears down on the sleeve annulus 16. The finger 15 is forced downwardly by a plate 19 bearing on an up-facing flange 20 on the finger end 18 secured to the switch block 10 by suitable screws 21. The downward pressure may be increased by tightening the screws 21, and suitable clearance is provided so that the under side of the finger end 18 preferably does not actually engage the switch block 10.

The switch operating fluid, which may be air, is applied to the interior of the flexible sleeve 14 through a passage 22 which enters the finger end 18, proceeds downwardly through the finger 15 to a lengthwise central point therein and thence transversely through the finger to the interior of the flexible sleeve 14 about opposite the switch block inlet and outlet passages 12 and 13.

Thus the flexible sleeve 14, in the FIGURE I illustration, fits snugly over the end portions of the finger 15, within the recess 11, and is radially spaced somewhat from the reduced diameter central portion of the finger 15. Accordingly, the fluid flow between the switch inlet and outlet passages 12 and 13 may force the flexible sleeve 14 against the central reduced diameter of the finger 15 to form an annular flow channel, when the switch is unenergized, i.e., when no pressure, or a minimum, is being applied to the interior of flexible sleeve 14. With this arrangement the flexible sleeve may be formed to fit snugly within the recess 11, if desired, or a clearance may be provided radially between the flexible sleeve 14 and the wall of the recess 11. Such a clearance is shown in FIGURE I as a means of providing at least a part of a flow passage around the flexible sleeve 14.

It is important to prevent fluid flow from passage 12 to the passage 13 from bodily pushing the flexible sleeve 14 against either passage 12 or 13 in a self-blocking action. Thus the relative dimensional characteristics and arrangements of the recess 11, the flexible sleeve 14, and the support finger 15, must be in such a combination as to prevent such blocking. For example if the sleeve 14 fitted loosely on the finger 15 and snugly in the recess 11, such undesirable blocking could easily occur.

The FIGURE I structure thus provides two separate variable volume chambers within the recess 11, with the flexible sleeve 14 as the dividing wall therebetween. The outer chamber is between the wall of the recess and the flexible sleeve and provides a flow connection passage between the switch block inlet and outlet passages 12 and 13. The inner chamber is between the finger 15 and the flexible sleeve 14, although the "chamber" may not have much radial dimension with the sleeve in relaxed or minimum internal pressure condition. The inner chamber thus is the switch operating pressure chamber, to which the finger passage 22 leads in the application of switch operating pressure.

In the operation of the FIGURE I structure, the switch "off" condition finds zero or minimum internal fluid pressure in the sleeve 14 and the "process" fluid flow travelling from inlet 12 to outlet 13 around the sleeve 14. In the switch "on" condition, fluid pressure expands the sleeve 14 into area contact with the wall of the recess 11 to block off the inlet and outlet 12 and 13 to shut off the process flow.

The FIGURE III structure is like that of FIGURE I in all respects, except that it is provided with a support finger 23 which has a single diameter throughout its extent within the switch block recess 11'. The flexible sleeve 14' fits snugly on the finger 23 throughout the length of the sleeve. Further, a substantial clearance is provided between the sleeve 14' and the wall of the recess 11'. With this arrangement, therefore, the flexible sleeve, while zero or minimum pressure is applied thereto, cannot be pushed laterally by the fluid flow through the switch unit and therefore cannot be made to block either of the inlet or outlet passages 12' and 13' while the switch unit is unenergized.

The FIGURE III structure is further distinguished by the fact that the inlet passage 12' is near the mouth of the recess 11' and the output passage 13' is near the bottom of the recess 11'. The operating pressure inlet passage 22' is provided with a lateral passage opposite each of the inlet and outlet passages 12' and 13'. This arrangement emphasizes the area contact nature of the switch device of this invention, since, in the FIGURE III structure, a seal is provided between the inlet and outlet passages 12' and 13' not only transversely around the flexible sleeve 14' but also almost the full length of flexible sleeve. Thus a more effective, larger area seal is provided.

In the operation of the FIGURE IV structure, a flexible plug 24 is compressed endwise to provide lateral expansion in a fluid flow shut-off action. A switch block 25 is formed with a cylindrical dead-end recess 26 therein, with a fluid flow inlet 27 and a fluid flow outlet 28 both opening on the recess 26 through its side wall, about midway of the length of the recess 26. In the recess 26 and concentric therewith, a support shaft 29 is mounted with its lower end set into the bottom of the recess 26. The flexible plug 24 is generally cylindrical, with a shallow hour-glass formation which provides a fluid flow passage around the plug 24 from the inlet 27 to the outlet 28, when there is zero, or minimum end compression on the plug 24.

As a means of endwise compressing the flexible plug 24, a rigid cylindrical boss 30 is located in the mouth of the recess 26 for close-fitting sliding movement therein. The boss 30 has a central, axial opening 31 therein for receiving the upper end of the support shaft 29, in piston-like action without end abutment, as the boss 30 is forced down against the flexible plug 24. The opening 31 is provided with a side vent 32 to avoid pressure build-up therein during the action of the device. Accordingly, as downward pressure is applied to the boss 30, the flexible plug is spread laterally, losing its hour-glass shape and filling out the recess 26 so as to block off the inlet and outlet passages 27 and 28. A cap-washer 33 is mounted over the boss 30 and is secured to the switch block 25 with a flexible O-ring 34 held thereby against both the switch block 25 and the boss 30 to seal off the mouth of the recess 26.

As a means of operating the switch device of FIGURE IV, a bellows 35 is provided, secured to or integral with the boss 30. Thus when an operating fluid signal expands the bellows 35, the flexible plug 24 is spread sideways under end compression, and the fluid flow passages 27 and 28 are blocked off in an area seal relationship between the plug 24 and the wall of the recess 26.

The switch device according to this invention is illustrated as a fluid sampling device in FIGURES V–X inclusive. This device is for controlling fluid flow to transfer a fixed volume fluid sample from a fluid sample flow to a fluid carrier flow, for example in chromatographic gas analysis. Each of these devices, FIGURES V, VI, VII, comprises a fixed volume conduit FV and a group of specially arranged switch units, such as those exemplified in FIGURES I–IV.

FIGURE V shows a simple form of this device wherein the fixed volume conduit FV has, at one end, a pair of switch device units *a* and *b*, and at its other end, another pair of switch device units *c* and *d*. The unit *a* (like FIGURE I), for example, has a chamber 36, a flexible sleeve 37 therein and shown as a dotted line, an operating gas pressure inlet 38 leading to the interior of the sleeve 37, a gas flow inlet passage 39 and a gas flow outlet passage 40.

The other units, *b*, *c*, and *d* are identical with unit *a*. In each case the operating pressure passage has been indicated as OP. The FIGURE V device is operated as follows, in accordance with a suitable schedule of operating the various units. First, units *b* and *d* are simultaneously closed. Thus the sample gas flows in through unit *a*, through the fixed volume conduit, and out through unit *c*. As the next step, switch units *a* and *c* are shut off, thus isolating a slug of sample gas in the fixed volume conduit. As the final step, switch units *b* and *d* are opened and carrier gas flow enters through unit *b* to flush the gas sample in the fixed volume conduit out through unit *d* to a suitable process such as a chromatographic column.

Any suitable programming arrangement may be used to open and close the various switch units according to predetermined schedule. Such a programmer (not shown), could comprise a series of cam operated electrical switches which in turn operate a solenoid valve in each of the various (OP) gas operating lines of FIGURE V.

FIGURE VI illustrates a switch device according to this invention, wherein both the carrier gas flow and the sample gas flow may proceed through the device at the same time, without intermingling. The switch units are indicated in series as 1–5 each being like FIGURE I, as described in connection with FIGURE V.

As an initial condition in the device of FIGURE VI, units 2 and 4 are closed. Thus the sample gas flow enters through unit 1, passes through the fixed volume conduit, and exits through unit 5. The carrier gas flow, on the other hand, enters between unts 2 and 3, passes through unit 3, and exits from a point between units 3 and 4. As the next step in the operation of the FIGURE VI device, units 1, 3, and 5 are closed, and units 2 and 4 are opened. Thus a volume of sample gas is isolated in the fixed volume conduit and then the carrier gas flushes it out. This new travel of the carrier gas is: enter between units 2 and 3, pass through unit 2, and then flush out the fixed volume sample through unit 4 and to exit to process from a point between units 3 and 4. As in all of these devices, suitable switch unit operation thereafter clears the device for new action in obtaining a new fixed volume gas sample slug.

FIGURE VII illustrates a switch device according to this invention wherein both the carrier gas flow and the sample gas flow may proceed through the device at the same time, both independently, and while the sample flushing is taking place. This device differs from the FIGURE VI structure only in that a sample flow by-pass 41 is provided from a point ahead of unit 1 to a point after unit 5 and an extra switch unit, 6, is established in the by-pass 41 near its starting point. Thus the initial condition of this device is to close units 2, 4, and 6. Then, with a sample gas slug established in the fixed volume conduit, units 1, 3, and 5 are closed, and units 2 and 4 opened to flush out the sample with the carrier, and unit 6 is opened to by-pass the sample flow while the flushing is accomplished.

It should be noted throughout FIGURES V, VI and VII, as well as later in FIGURE X, that the various switch units are operationally grouped in close adjacency. Thus when one flow is cut off and another introduced, there is only a negligible amount of dead space, and therefore mixing of different flows, with which to contend. Thus in FIGURE V the pipe section 40 between the switch unit *a* and the connection of the fixed volume conduit is negligible in length as indicated by arrow 42.

The structure of FIGURES VIII, IX and X is a showing of a switch device according to this invention, wherein the device of FIGURE VI is provided with units as illustrated in FIGURE I.

In this structure a single switch block 43 is provided with an in-line series of FIGURE I switch units, shown in FIGURE X as 1′, 2′, 3′, 4′, and 5′.

Thus FIGURES VIII, IX and X illustrate the rugged, simple structure of a switch device according to this invention.

This invention, therefore, provides a new and improved fluid flow pressure switch device.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

1. A pressure operated switch device for controlling fluid flow, comprising, in combination, a body having a generally cylindrical dead end recess therein, fluid flow passages into and out of said recess through the side wall thereof, a generally cylindrical assembly mounted in and substantially filling said recess in sealing relation with the mouth of said recess whereby said recess provides a fluid flow link between said passages in the form of a sleeve-like opening around said assembly, said assembly comprising a rigid finger, a flexible sock mounted on said finger in the form of and essentially filled by said finger and sealed thereto at the mouth of said sock, and a passage in said finger for introducing fluid pressure into said sock as a means of expanding said sock to close off at least one of said passages, said flexible sock and said finger having such relative dimensions and characteristics with respect to each other and with respect to said recess as to prevent the blocking of either of said passages by said sock under the influence of fluid flow exteriorly of said sock when there is no sock expanding pressure in said finger passage.

2. A pressure operated switch device for controlling fluid flow, comprising, in combination, a body having a tubular recess therein, a fluid flow inlet passage to said recess and a fluid flow outlet passage from said recess, said passages opening on said recess in diametric opposition to each other at a point in the lengthwise central portion of said recess, and a switch operating assembly comprising a rigid finger extending substantially throughout the length of said recess and having a central portion of reduced diameter, an operating pressure introducing passage extending from the outer end of said finger to a point opposite said fluid flow passages and thence transversely through said finger, and a flexible sleeve mounted on said finger in close fitting relation with the normal diameter end portions thereof and clear of said fluid flow inlet and outlet openings in the absence of operating pressure in said operating pressure passage, said finger being secured to said recessed body at the mouth of said tubular recess, with the outer end portion of said flexible sleeve secured between the outer end portion of said finger and said recessed body, whereby said fluid flow is sealed into said recess for passage therethrough by travel around said operating assembly from said inlet passage to said outlet passage, and whereby said operating pressure is sealed between said sleeve and said finger, and the application of said operating pressure laterally expands said flexible tube into area contact blocking off relation with said inlet and outlet passages.

3. A pressure operated switch device for controlling fluid flow, comprising, in combination, a body having a tubular recess therein, a fluid flow inlet passage to said recess and a fluid flow outlet passage from said recess, one of said passages opening on said recess adjacent the mouth thereof and the other of said passages opening on the opposite side of said recess and adjacent the bottom thereof, and a switch operating assembly in said tubular recess, said assembly comprising a rigid finger extending substantially throughout the length of said recess and having an operating pressure introducing passage extending from the outer end of said finger to points opposite said fluid flow passages and thence transversely through said finger, and a flexible sleeve mounted on said finger in close fitting relation therewith, said finger being secured to said recessed body at the mouth of said tubular recess, with the outer end portion of said flexible sleeve secured between the outer end portion of said finger and said recessed body, whereby said fluid flow is sealed into said recess for passage therethrough by travel around said operating assembly from said inlet passage to said outlet passage free of flow blocking shut-off effect by said flexible sleeve when said operating pressure is absent, and whereby said operating pressure is sealed between said sleeve and said finger, and the application of said operating pressure laterally expands said flexible tube into area contact blocking off relation with said inlet and outlet passages.

References Cited in the file of this patent

UNITED STATES PATENTS

| | | |
|---|---|---|
| 2,336,450 | Voorhess et al. | Dec. 7, 1943 |
| 2,575,240 | Thompson | Nov. 13, 1951 |
| 2,756,959 | Hill | July 31, 1956 |
| 2,757,541 | Watson | Aug. 7, 1956 |
| 2,795,390 | Laurenty | June 11, 1957 |
| 2,833,151 | Harvey | May 6, 1958 |

FOREIGN PATENTS

| | | |
|---|---|---|
| 986,047 | France | Mar. 21, 1951 |
| 1,121,322 | France | Apr. 30, 1956 |